(12) United States Patent
Yoo (10) Patent No.: US 7,632,327 B2
(45) Date of Patent: Dec. 15, 2009

(54) DUST COLLECTING APPARATUS FOR A VACUUM CLEANER AND A VACUUM CLEANER INCORPORATING THE SAME

(75) Inventor: Dong-hun Yoo, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 594 days.

(21) Appl. No.: 11/490,427

(22) Filed: Jul. 20, 2006

(65) Prior Publication Data
US 2007/0079590 A1 Apr. 12, 2007

(30) Foreign Application Priority Data
Oct. 11, 2005 (KR) ...................... 10-2005-0095614

(51) Int. Cl.
*B01D 45/12* (2006.01)
(52) U.S. Cl. .............................. 55/424; 55/429; 55/457; 55/DIG. 3
(58) Field of Classification Search .................... 55/337, 55/424, 429, 457, 459.1, DIG. 3
See application file for complete search history.

(56) References Cited

U.S. PATENT DOCUMENTS

| 4,133,658 A * | 1/1979 | Callewyn ...................... 55/315 |
| 2004/0025285 A1 | 2/2004 | McCormick et al. .......... 15/352 |
| 2004/0231091 A1* | 11/2004 | Oh .............................. 15/347 |

* cited by examiner

*Primary Examiner*—Robert A Hopkins
(74) *Attorney, Agent, or Firm*—Ohlandt, Greeley, Ruggiero & Perle, L.L.P.

(57) ABSTRACT

The vacuum cleaner includes a cyclone unit installed on a mount part on the vacuum cleaner housing; the cyclone unit includes a cyclone chamber formed on the inside of the cyclone unit to separate dust from drawn-in air, and an entrance connected to the first channel of the vacuum cleaner housing, leading drawn-in air into the cyclone chamber; the vacuum cleaner housing includes a fixing unit, which fixes the cyclone unit detachably in position on the mount part by raising a section of the cyclone unit; and the entrance to the cyclone unit is connected separatably to the exit to the first channel in the direction in which the cyclone unit is raised by the fixing unit.

14 Claims, 4 Drawing Sheets

DUST COLLECTING APPARATUS FOR A VACUUM CLEANER AND A VACUUM CLEANER INCORPORATING THE SAME

CROSS-REFERENCE TO RELATED APPLICATIONS

This application claims the benefit under 35 U.S.C. § 119(a) from Korean Patent Application No. 2005-0095614, filed on Oct. 11, 2005, the disclosure of which is incorporated herein by reference in its entirety.

BACKGROUND OF THE INVENTION

1. Field of the Invention

This invention relates to a vacuum cleaner, and more particularly to a dust collecting apparatus for a vacuum cleaner.

2. Description of the Prior Art

Vacuum cleaners generally clean unclean surfaces by drawing in dust-laden air from the unclean surface, separating the dust from the drawn-in air, and depositing the dust in a dust collecting apparatus. Recently, cyclone dust collecting apparatus using a centrifugal force to perform the task of separating dust from the drawn-in air have been developing. Such cyclone dust collecting apparatus are becoming widely used because, unlike conventional dust bags, they are clean and long-lasting.

Conventional dust collecting apparatus comprise a cyclone unit with a cyclone chamber therein to separate the dust from the air using a centrifugal force, and a dust collection container with a dust collection chamber therein to accommodate dust after it has been separated from the air. The dust collecting container and cyclone unit are attached removably in order to facilitate the task of removing the dust from the dust collection chamber. In this situation, the cyclone unit is fixed in position on the housing of the vacuum cleaner, and the dust collection container is designed to be attached to the cyclone head separately.

A problem with this type of vacuum cleaner is that the fixed structure of the cyclone unit limits the potential for improvement of essential features thereof, such as the dust collection efficiency of the cyclone unit and the ease of maintenance and repair.

SUMMARY OF THE INVENTION

The aim of this invention is to provide a dust collecting apparatus for a vacuum cleaner comprising a cyclone unit with an improved fixed structure, and a vacuum cleaner incorporating the dust collecting apparatus, in order to resolve the problems described above and facilitate further improvement of the features of the cyclone unit.

In order to achieve the aims of the present invention as described above, there is provided a vacuum cleaner comprising a housing and a cyclone dust collecting apparatus. The vacuum cleaner housing comprises a mount part and a fixing unit. The mount part is disposed between a first channel, which draws in dust from outside the vacuum cleaner, and a second channel, which discharges air from which the dust has been separated. The cyclone dust collecting apparatus is installed on the mount part, and comprises a cyclone unit, which is fixed in position on the mount part by being partially raised by the fixing unit. The cyclone unit comprises a cyclone chamber to remove dust from the drawn-in air, and an entrance disposed on the mount part, connected to the exit to the first channel and leading drawn-in air into the cyclone chamber. The entrance to the cyclone unit and the exit to the first channel are separately connected in the direction that the cyclone unit is raised by the fixing unit.

The structural development of the cyclone unit has been simplified as a result of changes in the internal structure, explained in detail below.

According to one embodiment of this invention, the cyclone dust collecting apparatus comprises a dust collection container accommodating dust separated from the drawn-in air, detachably connected to the base of the cyclone unit and penetrated by the exit through which purified air is discharged; and that the entrance to the second channel formed on the bottom of the mount part and the exit to the dust collection container can be selectively pressed together in the direction in which the cyclone unit is raised.

The cyclone unit additionally comprises a cyclone head connected to the fixed unit, able to be raised on the inside of the mount part, and an air intake channel formed on the outside of the cyclone head as the entrance to the cyclone unit; and the entrance to the air intake pipe is raised in the same direction as the cyclone head, and is curved upwards so as to be parallel to the direction in which the entrance to on the outside of the cyclone head is raised, making it possible to connect selectively to the exit of the first channel.

The fixing unit here comprises an operating lever, rotatably fastened to the upper wall of the mount part, and further comprising an operating lever disposed on the outside of the housing to be operated by the user; a hook member protruding from the upper surface of the cyclone head that can be attached by a hook mechanism to the first through hole formed on the rotation plate; a fixing projection penetrating the second through hole formed on the rotation plate, preventing the cyclone head from rotating when the rotation plate is rotating, by being inserted into the hole formed on the upper wall of the mount part; and one pair of first guide cams, one guide cam corresponding to the rotation plate and the other guide cam corresponding to the cyclone head, in order that the cyclone head rises when the rotation plate is rotated.

Additionally, the first through hole comprises a second guide cam formed on the surface contacting the hook mechanism, so that the angle of inclination is equal to that of the first guide cams.

The cyclone unit further comprises a cyclone container on the inside of the cyclone chamber, installed inside the cyclone head, and disposed on top of the dust collecting container; the cyclone container is fixed in position in the cyclone head, so as to rise together with the cyclone head when the fixing unit is in operation; and the dust collection container comprises a first air discharge pipe formed to connect the dust collection container to the bottom of the cyclone container.

The cyclone container may be supported on the inside of the cyclone head by a support structure fixed in position on the external lower wall of the cyclone head; movement of the lower part of the support structure and the lower part of the cyclone container may be synchronized with the rise of the cyclone head; and the bottom of the support structure and the bottom of the cyclone container may be detachably connected to the top of the external wall of the dust collecting container and the top of the first air discharge pipe respectively.

The exit to the air intake pipe may be connected to the lower wall of the cyclone container and lead the drawn-in air into the cyclone container on a tangent to the internal surface of the cyclone container; the cyclone container may comprise a second air discharge pipe extending upwards from the bottom surface thereof; and the bottom of the second air discharge pipe may be connected to the top of the first air discharge pipe when the cyclone head is raised.

Additionally, the cyclone container may be formed at a predetermined distance from the upper wall of the cyclone head, so the dust discharge port is connected to the dust collecting container, and the cyclone container may comprise a backflow prevention projection protruding downwards from the upper wall of the cyclone head to prevent the secondary intake back into the cyclone chamber of dust previously discharged through the discharge pipes.

The entrance to the first channel may penetrate the side wall of the mount part; that the connection pipe connected to the entrance of the first channel may be integrally formed on the external surface of the dust collecting container when the dust collecting container is mounted on the mount part; and that the bottom of the air intake pipe may be connected to the top of the connection pipe when the cyclone head is lowered.

Additionally, the mount part may comprise a hollow formed on the side wall to accommodate the air intake pipe and the connection pipe.

DESCRIPTION OF THE EXEMPLARY EMBODIMENTS

The exemplary embodiment of the present invention is explained in detail hereinbelow, referring to the attached drawings.

Figure 1:
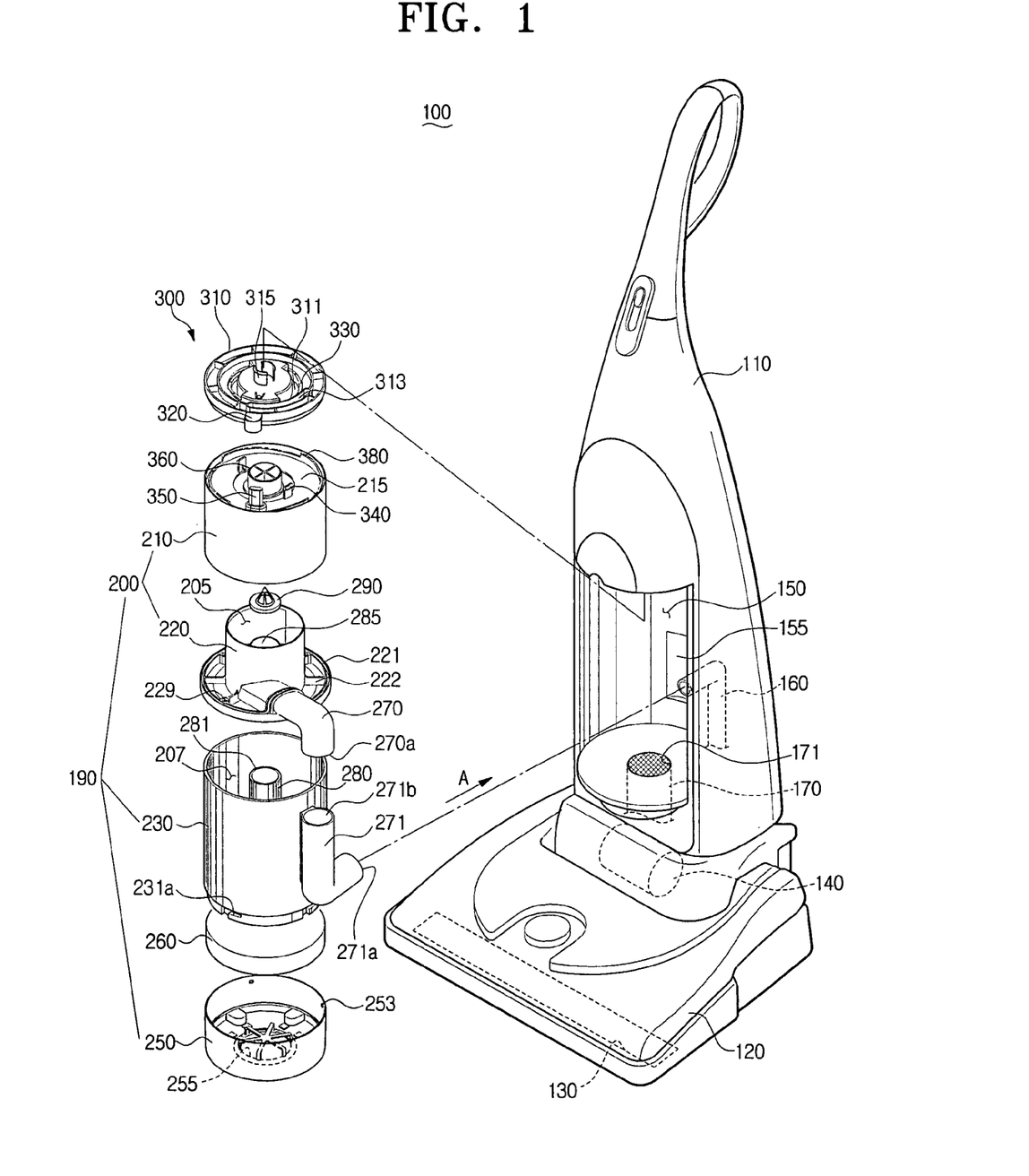
FIG. 1 is a perspective view of a vacuum cleaner according to an embodiment of the present invention in a disassembled state.

The exemplary embodiment of a vacuum cleaner 100 of this invention illustrated in FIG. 1 comprises a housing 110, cyclone dust collector 190, and a fixing unit 300.

The vacuum cleaner housing 110 comprises an intake motor 140, suction port assembly 120, and a mount part 150. The suction port assembly 120 comprises a dust intake port 130, which draws in dust from the unclean surface, along with the surrounding air, using the suction force generated by the intake motor 140. Air that has been drawn in through the dust intake port 130 is led into the inside of the mount part 150 through the first channel 160. The mount part 150 is provided on the housing in order to accommodate the cyclone unit 200, described below, the fixing unit 300, and the rotation plate 310. A hollow 155 is formed on the inside surface of the mount part 150 to accommodate the air intake pipe 270 and the connection pipe 271 of the cyclone unit 200.

The cyclone dust collecting apparatus 190 comprises a cyclone unit 200, which separates the dust drawn in through the first channel 160 from the drawn-in air by a centrifugal force, and a dust collection container 230.

The cyclone unit 200 is installed on the mount part 150 of the housing 110 of the vacuum cleaner. The cyclone unit 200 in this embodiment is formed so as to prevent the dust filtered from the drawn-in air from flowing out when the cyclone unit 200 changes position, and comprises a cyclone head 210, a cyclone container 220, and an air intake pipe 270. Here, the air intake pipe 270 is connected to allow air to flow into the first channel 160 of the housing 110 when the cyclone unit 200 is mounted.

Figure 2:
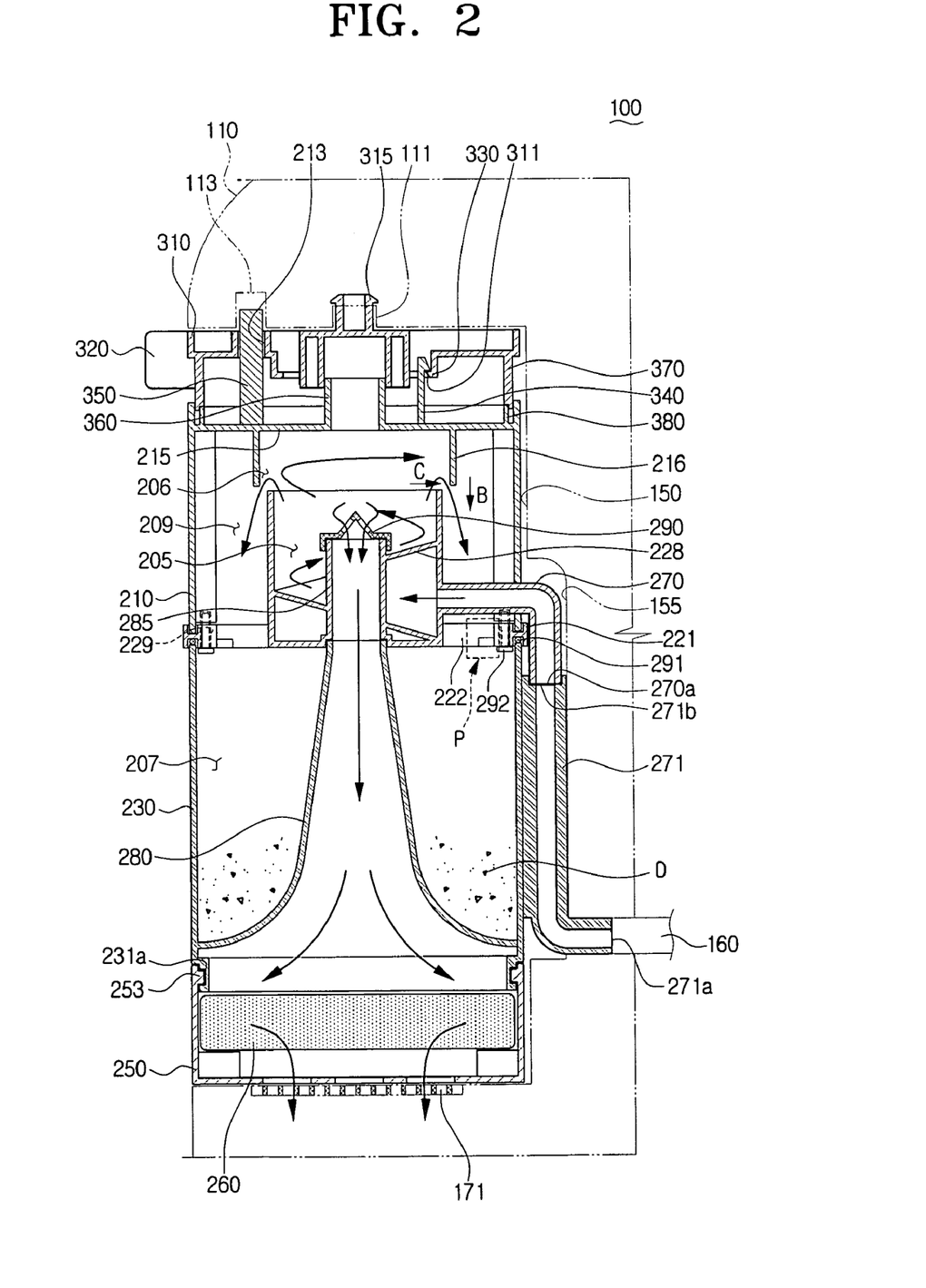
FIG. 2 is a sectional view showing the operational state of the cyclone unit in an embodiment of the present invention.

As illustrated in FIG. 1 and FIG. 2, the cyclone head 210 is cylindrical and open at the base; and the dust collection container 230 is cylindrical and open at the top, and is connected detachably to the base of the cyclone head 210. The cyclone chamber 205, which separates dust from the air drawn in through the air intake pipe 270, and the dust collection chamber 207, which collects the dust from the cyclone chamber, are disposed on the inside of the cyclone head 210 and the dust collection container 230, respectively.

The cyclone container 220 is cylindrical and open at the top, and on the inside is formed the cyclone chamber 205. The top of the cyclone chamber 205 is covered by the ceiling 215 of the cyclone head 210, and remains open through the upper rim of the cyclone container 220 being installed at a predetermined distance from the ceiling 215 of the cyclone head 210. The open space thus functions as a dust discharge port 206, which discharges dust separated by a centrifugal force from the air swirling upwards in the cyclone chamber 205. In the situation that air drawn into the cyclone chamber 205 reaches the dust discharge port 206, the dust from the drawn-in air is discharged through the dust discharge port 206 in the direction of C in FIG. 2. A guide member 228 leads the drawn-in air from the air intake pipe 270, explained below, into the cyclone chamber 205.

The cyclone container 220 of this embodiment of the present invention is disposed on top of the dust collection chamber 207 and closed at the bottom, enclosing the cyclone chamber 205 in a space that is separated from the dust collection chamber 207. The cyclone container 220 is installed so that a predetermined space is formed between the outer surface of the cyclone container 220 and the inside surface of the cyclone head 210. The cyclone chamber 205 and the dust collection chamber 207 are connected only by the dust discharge passage 209, which is formed between the cyclone container 220 and the cyclone head 210, and the dust discharge port 206.

In order for the dust collection chamber 207 to be connected to the cyclone chamber 205 in the manner described above, the cyclone container 220 is supported in this embodiment by a support structure 221 and support ribs 222 on the inside of the cyclone head 210. The support structure 221 forms a ring around the cyclone container 220, and is fixed in position between the cyclone head 210 and the dust collection container 230 when the dust collection container 230 is attached to the cyclone head 210. In FIG. 2, a sealing member 291 keeps the inside of the cyclone unit 200 airtight when the dust collection chamber 207 is attached to the bottom of the support structure 221, and the support structure 221 is fastened to the cyclone head 210 by screws or other fastening members 292 which penetrate the fastening hole 229. As a result of this kind of organization of the cyclone container 220, not only can the dust that has collected in the dust collection chamber 207 be prevented from rising out of the dust collection chamber 207 again, but also when the cyclone unit 200 is tilted, the dust collected in the dust collection chamber 207 can be prevented from flowing towards the cyclone head 210.

The support ribs 222 connect the support structure 221 to the cyclone container 220, and the support structure 221 and support ribs 222 support the cyclone container 220, so that the dust discharge passage 209 and the dust discharge port 206 can be formed. These support ribs 222 may be formed with a predetermined width, narrow enough that contact with the falling dust D being discharged from the cyclone chamber 205 is minimized, and the support ribs 222 may be formed radiating from the cyclone container 220, in order to support the cyclone container 220 more effectively. Additionally, at least one of the support ribs 222 may be positioned so as to block the path P in FIG. 2 along which the dust flows towards the cyclone head 210, when the cyclone unit 200 is tilted while the vacuum cleaner 100 is in use. Accordingly, even if the cyclone dust collector 190 is on a slant, and the piled dust is tipped in one direction inside the dust collection container 230, the dust D is prevented from entering the cyclone head 210 by the support ribs 222.

The dust collection chamber 207, as explained above, is disposed on the inside of the dust collection container 230, below the cyclone chamber 205 when the cyclone head 210 and the dust collection container 230 are attached, and is connected to the cyclone chamber 205 through the dust discharge port 206 and the dust discharge passage 209 successively. The dust collection chamber 207 and the cyclone chamber 205 comprise separate spaces. As a result of this, dust D carried by air passing through the inside of the dust collection chamber 207 from the inside of the cyclone chamber 205 can be prevented from flowing back into the cyclone chamber 205. Because the dust discharge passage 209 is formed between the cyclone chamber 205 and the cyclone head 210, even if the cyclone unit 200 is on a slant while the vacuum cleaner 100 is in operation, the dust D moving towards the cyclone head 210 is prevented from entering the cyclone chamber 205. Moreover, the dust storage capacity of the dust collection chamber 207 is directly related to the size of the dust collection container 230 without regard to the cyclone chamber 205, and can be established freely by altering the size of the dust collection container.

In this embodiment, the airflow in the cyclone unit 200 is least stable in the region adjacent to the dust discharge port 206, so the situation could arise in which dust discharged through the dust discharge port 206 flowed back into the cyclone chamber 205 due to the instability of the airflow. In order to solve this problem, the cyclone unit 200 of the present invention comprises cylindrical backflow prevention projections 216 protruding downwards from the ceiling 215 of the cyclone head 210. Dust that has been discharged through the dust discharge port 206 can be prevented from reentering the cyclone chamber 205 by the backflow prevention projections 216. The inside diameter of the bottom tips of the backflow prevention projections 216 may be larger than the inside diameter of the cyclone container 220, as the rotational velocity of air swirling upwards towards the backflow prevention projections 216 decreases proportionally to the increase of the rotational radius of the swirling air. Accordingly, dust micro-particles contained in the air that cannot be expelled through the dust discharge port 206 can descend in the direction of arrow B in FIG. 2, and drop into the dust collection chamber 207 by their own weight.

The air intake pipe 270 penetrates the wall of the cyclone unit 200 and is connected to the cyclone container 220, so can be made to connect the first channel 160 of the housing 110 to the inside of the cyclone container 220, allowing air to flow between the two. The air intake pipe 270 in this invention is integrally formed with the cyclone container 220, support ribs 222, and support structure 221. As a result of this, the air intake pipe 270 can be installed in the cyclone head 210 together with the cyclone container 220, thereby making it possible to simplify the structure of the cyclone unit 200. The air intake pipe 270 in this embodiment of the present invention is connected to the exit of the first channel 160, and the direction in which they are connected is parallel to the direction in which the dust collection container 230 and the cyclone head 210 are connected. In order for this to happen, the entrance 270a to the air intake pipe 270 and the exit to the first channel 160 are parallel to the direction of movement E, in FIG. 4, of the cyclone head 210.

Figure 4:
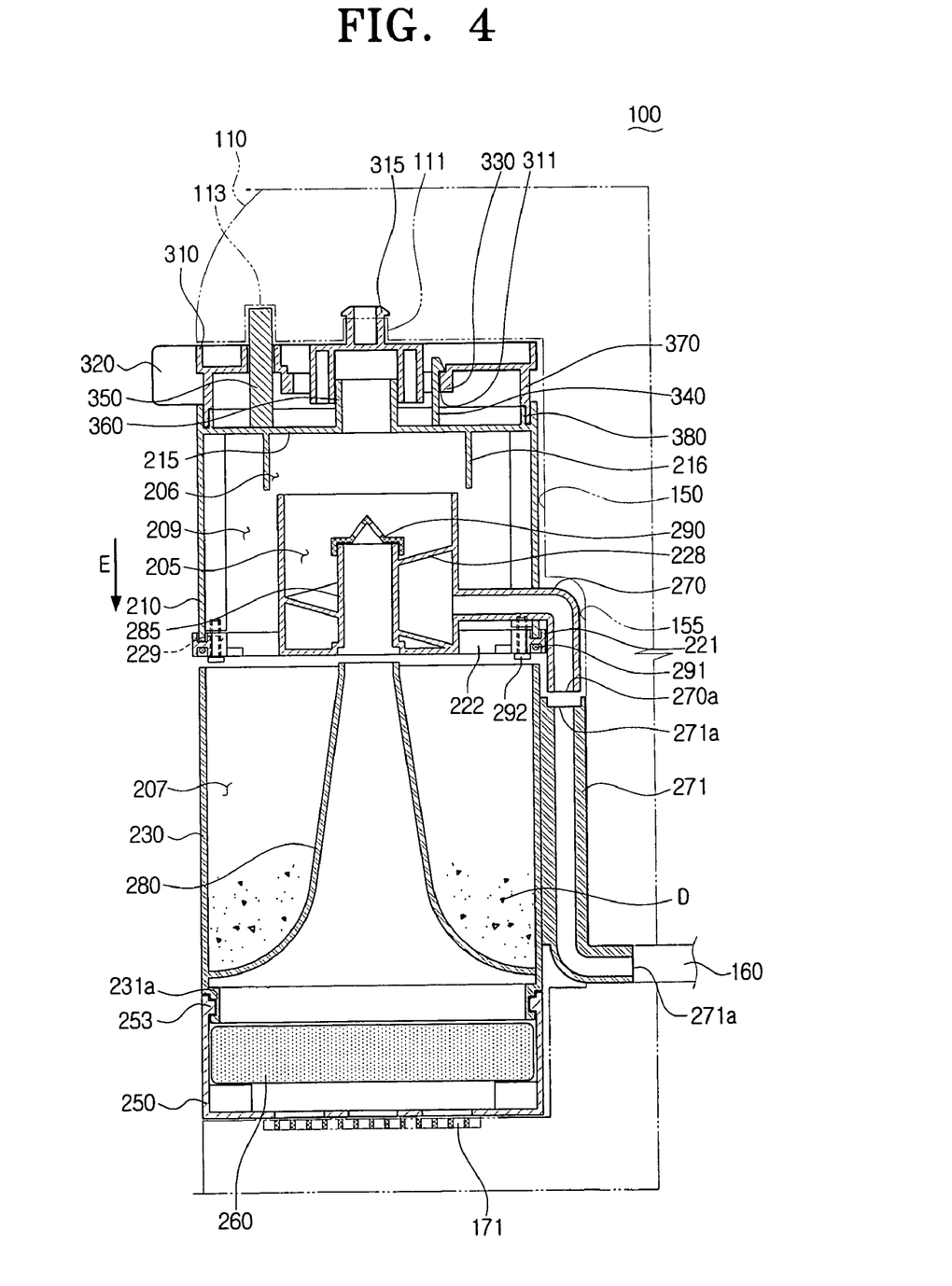
FIG. 4 is a sectional view showing the mounted state of the cyclone unit in an embodiment of the present invention.

However, in this embodiment the exit to the first channel 160 on the mount part 150 is on a slant relative to the direction of movement E of the cyclone head 210. The first channel 160 and the air intake pipe 270 cannot easily be connected directly, so this embodiment further comprises a connection pipe 271. The connection pipe 271 is integrally formed on one side of the dust collection container 230, and is connected at the top 271b to the entrance 270a to the air intake pipe 270 following the direction in which the cyclone head part 210 is raised. The entrance 271a formed on the bottom of the connection pipe 271 is connected to the exit to the first channel 160 in direction A, in FIG. 1, in which the dust collection container 230 is mounted. If the exit to the first channel 160 is formed so that it can connect directly to the entrance to the air intake pipe 270, installation of the kind of connection pipe 271 described can be omitted. However, it is advisable that the cyclone unit 200 comprise a connection pipe 271, so that the air channel from the exit to the first channel 160 to the entrance of the air intake pipe 270 can be managed efficiently.

According to the organization of the air intake pipe 270 described above, if the fixing unit 300, described below, is operated to attach the dust collection container 230 to the cyclone head 210, the cyclone head 210 can be raised, unlike the situation in the prior art. Mounting such a cyclone unit 200 can also be simplified and the cyclone unit 200 can be constructed more freely than in the prior art, as a result of structural improvements in this embodiment of the present invention, such as making the cyclone unit 200 able to prevent the scattering and backflow of dust.

This embodiment of the present invention is arranged so that air discharged from the cyclone chamber 205 enters the cyclone head 210, and subsequently passes through the bottom of the dust collection container 230 and the second channel 170 of the housing 110. In order to achieve this, the cyclone unit 200 in this embodiment comprises a first air discharge pipe 280 and a second air discharge pipe 285. As a result of this, the internal structure of the vacuum cleaner housing 110 can be simplified. In order to achieve this, the first air discharge pipe 280 protrudes upwards from the bottom of the dust collection container 230, and the exit formed at the lower end covers the lower end of the dust collection container 230. The inside diameter of the first air discharge pipe 280 increases as the pipe extends downwards, so the dust D in the dust collection chamber 207 settles on the bottom of the first air discharge pipe 280.

The top of the first air discharge pipe 280 described above is connected to the base of the second air discharge pipe 285 at the time the cyclone head 210 is attached to the dust collection container 230. The second air discharge pipe 285 extends upwards from the base of the cyclone container 220, and has a grille 290 installed at the top, so dust on the inside of the cyclone chamber 205 can be prevented from directly entering the first air discharge pipe 280 and the second air discharge pipe 285. The second air discharge pipe 285 may be integrally formed with the cyclone container 285.

The cyclone unit 200 in this embodiment raises dust separation efficiency by further comprising a filter member 260 to filter for a second time air, which has been discharged from the cyclone chamber 205. In order to achieve this, the open base of the dust collection container 230 can be opened and shut by a lower cover 250, and the filter member 260 is installed in the space formed between the dust collection container 230 and the lower cover 250. The lower cover 250 comprises a slide projection 253 attached to a groove 231 a formed on the bottom surface of the dust collection container 230, whereby the filter member 260 can be mounted independently and maintenance of the filter member 260 is simplified.

Figure 3:
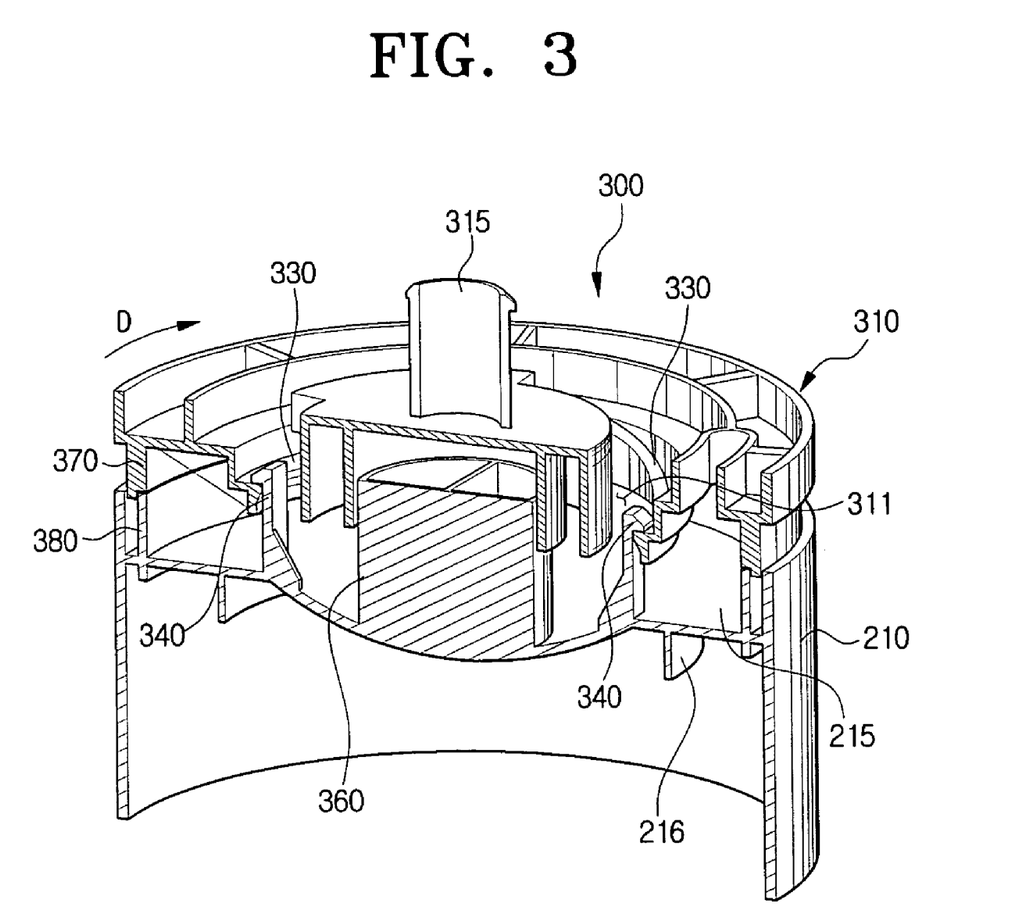
FIG. 3 is a perspective sectional view showing the fixing unit from FIG. 1 in the assembled state.

The fixing unit 300, as explained above, raises the cyclone unit 200 and fixes it in position on the mount part 150, making it possible to attach the dust collection container 230 to the cyclone head 210. To achieve this, the fixing unit 300 in the present embodiment, as illustrated in FIGS. 3 and 4, comprises a rotation plate 310, a hook 340, a fixing projection 350 and first guide cams 370 and 380.

The rotation plate 310 is rotatably fixed to the upper wall 215 of the mount part 150 so as to rotate on an axis 315 formed in the axis hole 111 in the upper surface 215 of the mount part 150, and comprises an operating lever 320 protruding from the outer surface of the rotation plate 310 so as to be disposed on the outside of the vacuum cleaner housing 110 for easy manipulation by the user.

The base of the rotation plate 310 is attached to the cyclone head 210. In order to achieve this, the rotation plate 310 comprises a first through hole 311, and the cyclone head 210 comprises a hook 340 protruding from the upper surface thereof. The hook 340 hooks into the first through hole 311, thereby attaching the rotation plate 310 to the cyclone head.

The cyclone head 210 rises when the rotation plate 310 rotates. In order to achieve this, a pair of first guide cams 370 and 380 is formed on the area where the cyclone head 210 and the rotation plate 310 come into contact, to enable the cyclone head 210 to rise in response to the rotation of the rotation plate 310. The first through hole 311 is arcuate, and a second guide cam 330 is formed on the surface thereof in contact with the hook 340, with an angle of inclination equal to that of the first guide cams 370 and 380.

The fixing projections 350 protrude from the upper wall 215 of the cyclone head 210, penetrate the second through hole 313 of the rotation plate 310 when the cyclone head 210 is mounted, and are inserted into the second fixed hole 113 formed on the upper surface 215 of the mount part 150. Using this kind of fixing projection 350, the cyclone head 210 can be prevented from rotating when the rotation plate 310 is being rotated. A guide projection 360 is inserted into the lower center of the rotation plate 310, in order to connect the rotation plate 310 to the cyclone head 210.

The method of mounting the cyclone unit 200 in the embodiment of the present invention is set out in detail below. The cyclone head 210 is connected to the cyclone container 220 and mounted on the upper surface of the mount part 150 together with the rotation plate 310, and then the dust collection container 230 is inserted in the mount part 150 following the direction of arrow A in FIG. 1. At this time, it is advisable that the dust collection container 230 be inserted in such a manner that the connection pipe 271 integrally formed on the wall 230 thereof can connect to the exit of the first channel 160. In the embodiment of the present invention, the cyclone unit 200 is in the state illustrated in FIG. 4 when the dust collection container 230 is completely mounted.

The operating lever 320 can be operated when the dust collection container 230 is completely mounted, causing the rotation plate 310 to rotate in a predetermined direction C, in FIG. 3. The cyclone head 210 is lowered by the pair of first guide cams 370 and 380 and the second guide cam 330 arranged on the rotation plate 310 and the cyclone head 210, which move as a result of the rotation of the rotation plate 310. If the cyclone head 210 is lowered in this manner, as illustrated in FIG. 2, the base of the cyclone head 210 becomes attached to the upper part of the cyclone container 230, and likewise the lower part 270a of the air intake pipe 270 becomes attached to the upper part 271b of the connection pipe 271, the drive preparation is completed. Dismounting the dust collection container 230 is achieved by reversing the steps described above, and a detailed description of this procedure is omitted here.

Improvements in the efficiency of the cyclone dust collecting apparatus are more readily achieved as a result of the present invention, due to the arrangement of the cyclone unit and the fixing unit, in which the cyclone unit is raised and connected to the dust collection container.

In particular, according to the present invention, the first channel of the vacuum cleaner housing is connected to the air intake pipe of the cyclone unit facing the ascent path of the cyclone head. As a result of this, even if the cyclone chamber and the dust collection chamber are arranged separately on the inside of the cyclone unit, the cyclone unit can be easily mounted in the vacuum cleaner housing.

As explained above, in the situation that the cyclone chamber and the dust collection chamber constitute independent spaces on the inside of the cyclone unit and dust collection container respectively, the dust accommodated by the dust collection chamber can be prevented from entering the cyclone chamber as a result of the airflow between the two, and the dust collecting efficiency of the cyclone unit can also be improved.

While the present invention has been described above with reference to specific preferred embodiments, the scope of the present invention is not restricted to the embodiments illustrated and explained here. Rather, the intention is that the principles and scope of the attached patent request are described without deviation, so that those skilled in the art may readily understand the changes and corrections relating to the present invention. Therefore, it must be recognized that various alterations and modifications will fall within the scope of the invention.

What is claimed is:

1. A dust collecting apparatus for a vacuum cleaner, comprising:

a cyclone unit for separating dust from drawn-in air, the cyclone unit being installed inside a housing on a mount part between a first channel, through which dust-laden air is drawn into the vacuum cleaner, and a second channel, through which purified air is discharged from the vacuum cleaner;

a dust collection container wherein dust is accommodated after being separated from the drawn-in air, the dust collection container being detachably connected to the cyclone unit;

wherein the cyclone unit comprises a cyclone chamber on the inside thereof, to separate dust from the drawn-in air, and an entrance leading the drawn-in air towards the cyclone chamber connected to the exit of the first channel disposed on the mount part;

the housing comprises a fixing unit fixing the cyclone unit detachably to the mount part by raising a part of said cyclone unit;

the entrance to the cyclone unit and the exit from the first channel are detachably connected following a direction in which the cyclone unit is raised by the fixing unit;

the dust collection container includes a bottom penetrated by the second channel;

the entrance to the second channel and the exit to the dust collection container formed on the floor surface of the mount part are selectively pressed together, in the direction in which the cyclone unit is raised; and the fixing unit comprises a rotation plate comprising a rotational axis connected rotatably to the upper wall of the mount part and an operating lever disposed on the outside of the housing of the vacuum cleaner so that the operating lever can be rotated by the user.

2. The dust collecting apparatus for a vacuum cleaner according to claim 1,
wherein the cyclone unit further comprises an air intake pipe disposed on the outside of the cyclone head and penetrating the side wall of the cyclone head; and
wherein the air intake pipe ascends in the same direction as the cyclone head so that the entrance to the air intake pipe can selectively be connected to the exit to the first channel, and the exit to the first channel disposed on the outside of the cyclone head is curved in order to run parallel to the direction in which the cyclone head is raised.

3. The dust collecting apparatus for a vacuum cleaner according to claim 1, wherein the fixing unit comprises:
a hook protruding from the upper surface of the cyclone head that can be hooked through the first through hole formed on the rotation plate;
a fixing projection, which is inserted into a hole formed on the upper surface of the mount part and which penetrates the second through hole formed on the rotation plate, thereby preventing the cyclone head from rotating when the cyclone head rotates; and
a pair of first guide cams, formed facing each other, with one guide cam disposed on the operating lever and one guide cam disposed on the cyclone head, so that the cyclone head is raised when the rotation plate rotates.

4. The dust collecting apparatus for a vacuum cleaner according to claim 3, wherein a second guide cam is disposed on the surface of the first through hole in contact with the first guide cam, at an angle of inclination equal to the angle of inclination of the first guide cam.

5. The dust collecting apparatus for a vacuum cleaner according to claim 2, wherein the cyclone unit further comprises
a cyclone container, inside the cyclone chamber, which is installed inside the cyclone head, and disposed above the dust collection container;
the cyclone container is fixed in position on the cyclone head, and is raised together with the cyclone head when the fixing unit is in operation; and
the dust collection container comprises a first air discharge pipe connecting the dust collection container to the bottom of the cyclone container.

6. The dust collecting apparatus for a vacuum cleaner according to claim 5, wherein
the cyclone container is supported on the inside of the cyclone head by a support structure fixed to the base of the cyclone head; and
the base of the support structure is connected detachably to the top of the dust collection container, and the bottom of the cyclone container is connected detachably to the top of the first air discharge pipe, and the bottom of the support structure and the bottom of the cyclone container interlock with the cyclone head.

7. The dust collecting apparatus for a vacuum cleaner according to claim 6, wherein
the air intake pipe leads the drawn-in air into the cyclone container at a tangent, the exit to the air intake pipe being connected at the base of the cyclone container; and
the cyclone container comprises a second air discharge pipe extending upwards from the bottom of the cyclone container; and
the base of the second air discharge pipe becomes connected to the top of the first air discharge pipe when the cyclone head is lowered.

8. The dust collecting apparatus for a vacuum cleaner according to claim 7, wherein
the top of the cyclone container forms a dust discharge port connected to the dust collection container at a predetermined distance from the upper wall of the cyclone head, and
the upper surface of the cyclone head comprises a backflow prevention projection protruding downwards to prevent the repeat inflow into the cyclone chamber of dust discharged through the dust discharge port.

9. The dust collecting apparatus for a vacuum cleaner according to claim 2, wherein
the exit to the first channel penetrates the side wall of the mount part,
the connection pipe connected to the first channel when the dust collection container is mounted on the mount part is integrally formed on the outer surface of the dust collection container, and
the base of the air intake pipe is connected to the top of the connection pipe when the cyclone head part is lowered.

10. A dust collecting apparatus for a vacuum cleaner, comprising
a vacuum cleaner housing, which comprises a first channel, through which dust-laden air flows in from outside the vacuum cleaner, a second channel discharging purified air from which dust has been separated, and a mount part positioned between the first and second channels;
a cyclone dust collection apparatus, which comprises a cyclone unit to separate the dust from the drawn-in air, the cyclone dust collection apparatus being installed on the mount part, and a dust collection container to accommodate the dust separated from the drawn-in air, the dust collection container being attached detachably to the base of the cyclone unit; and
a fixing unit to support the cyclone unit, installed on the mount part, comprising a rotation plate to raise the cyclone unit, installed rotatably on the mount part, and one or more pairs of guide cams, formed with one cam of each pair facing the cyclone unit and one cam of each pair facing the rotation plate, in order to make the cyclone unit ascend and descend in response to the rotation of the rotation plate; and wherein
the cyclone unit comprises a cyclone chamber on the inside thereof, to separate dust from the drawn-in air, and an entrance connected to the exit of the first exhaust channel disposed on the mount part, guiding drawn-in air into the cyclone chamber, and
the entrance to the cyclone unit and the exit to the first channel are connected detachably in the direction in which the cyclone unit is raised.

11. The vacuum cleaner according to claim 10, wherein
the dust collecting apparatus further comprises a first air discharge pipe connected at the bottom of the dust collection container and the cyclone chamber in order to lead the purified air, and
the entrance to the disposed second channel on the bottom of the mount part and the exit to the disposed first air discharge pipe on the bottom of the dust collection chamber can selectively be pressed together in the direction in which the cyclone unit is raised.

12. The vacuum cleaner according to claim 11, further comprising:
a cyclone head connected to the fixing unit, and able to be raised inside the mount part; and
an air intake pipe on the outside of the cyclone head part, disposed by the entrance to the cyclone unit, penetrating the wall of the cyclone head; and wherein the entrance to the air intake pipe disposed on the outside of the cyclone head is curved to be parallel to the direction in which the cyclone head is raised, so that it is raised in the same direction as the cyclone head, and can selectively be connected to the exit to the first channel.

13. The vacuum cleaner according to claim 12, wherein
the exit to the first channel penetrates the wall of the mount part,
the dust collection container is integrally formed on the outer surface of the connection pipe, which is connected to the exit to the first channel when the dust collection container is mounted on the mount part, and
the bottom of the air intake pipe is connected to the top of the connection pipe when the cyclone head descends.

14. The vacuum cleaner according to claim 13, wherein the mount part comprises a hollow formed in the wall thereof to accommodate the air intake pipe and the connection pipe.

* * * * *